Figure 1:
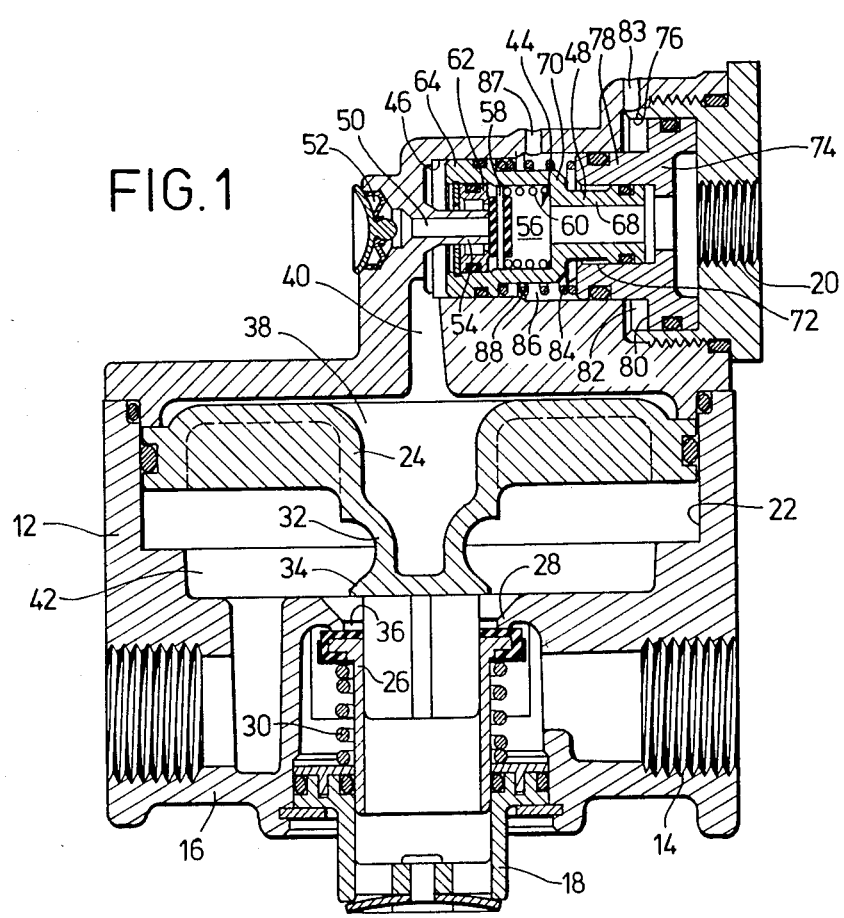

United States Patent [19]
Szudy et al.

[11] Patent Number: 4,725,101
[45] Date of Patent: Feb. 16, 1988

[54] PROPORTIONING CONTROL VALVE

[75] Inventors: James E. Szudy, Parma; Andrew Marsh, Elyria, both of Ohio

[73] Assignee: Allied Corporation, Morristown, N.J.

[21] Appl. No.: 45,352

[22] Filed: May 4, 1987

[51] Int. Cl.$^4$ .............................................. B60T 13/00
[52] U.S. Cl. ........................................ 303/6 C; 303/7; 303/40
[58] Field of Search ................ 303/6 C, 7, 40, 28–30, 303/60, 59, 63; 188/349; 137/627.5, 102

[56] References Cited

U.S. PATENT DOCUMENTS

| | | | |
|---|---|---|---|
| 4,230,373 | 10/1980 | Plantan | 303/7 |
| 4,261,624 | 4/1981 | Plantan | 303/7 |
| 4,348,062 | 9/1982 | Koenig | 303/6 C |
| 4,368,926 | 1/1983 | Bartholomew | 303/7 |
| 4,571,007 | 2/1986 | Carmichael et al. | 303/7 |
| 4,575,157 | 3/1986 | Reinecke | 303/40 |
| 4,640,556 | 2/1987 | Fauck et al. | 303/40 X |

*Primary Examiner*—Douglas C. Butler
*Attorney, Agent, or Firm*—Ken C. Decker; W. N. Antonis

[57] ABSTRACT

A proportioning control valve for a fluid pressure braking system for a tractor-trailer combination vehicle permits unproportioned communication of control pressure when the tractor is pulling a trailer but proportions communication of control pressure when the tractor is operated without a trailer to establish a proportonally lower pressure level at the outlet of the valve. The control valve, when operating in the proportioning mode, is also responsive to pressure in the brake reservoir. When pressure in the reservoir drops below a predetermined level, the control valve proportions at a rate which increases the pressure level at the outlet at a rate greater than the rate of increase of control pressure until the unproportioned pressure level is attained.

16 Claims, 2 Drawing Figures

PROPORTIONING CONTROL VALVE

This invention relates to a proportioning control valve for a fluid pressure braking system for a tractor-trailer combination vehicle.

Heavy duty articulated vehicles, comprising a tractor pulling a loaded trailer, are in common use. Although the tractor normally pulls a loaded trailer, occasionally the tractor is used in the so-called "bobtail" mode, that is, without a trailer. Of course, since the tractor normally pulls a trailer, the rear brakes of the tractor must be sized to stop a loaded vehicle. However, when the tractor is operated in the bobtail mode, the rear wheels of the tractor are overbraked, which may result in dangerous skidding and loss of control. Accordingly, it has been proposed that a proportioning valve be provided to reduce the braking effort of the rear wheel brakes of the tractor. This proportioning valve would be responsive to the pressure level in the trailer supply line which connects the braking system of the tractor to the braking system of the trailer. When the tractor is operated normally, that is, pulling a trailer, the supply line is pressurized, but when the tractor is operated in the bobtail mode the supply line is vented to atmosphere. A prior art solution to this problem is disclosed in U.S. Pat. No. 4,571,007.

Accordingly, the present invention provides a proportioned brake application when the tractor is operated in the bobtail mode, but also permits equalization of the input and output pressures. Accordingly, the present invention eliminates several additional valves and fitting which were required in prior art system. Accordingly, the present invention proportions communication up to a predetermined pressure which is determine by the ratio between the control pressure and the rear reservoir pressure, and thereafter permits full unproportioned braking pressure to be made available to the tractor rear wheel brakes.

Figure 2:
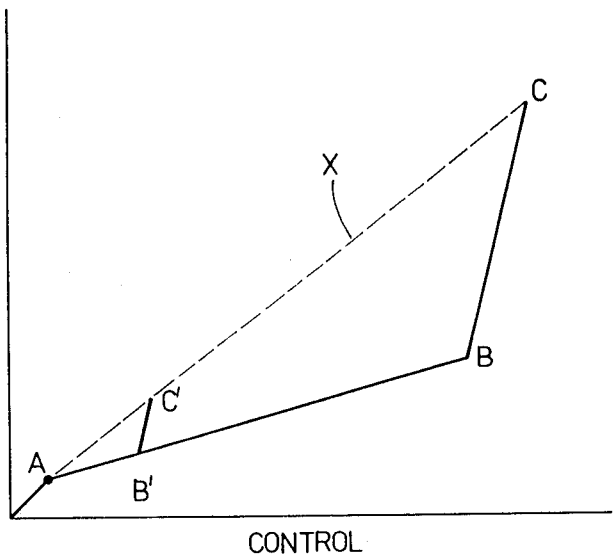

These and other advantages of the present invention will become apparent from the following specification, with reference to the accompanying drawings, in which:

FIG. 1 is a longitudinal cross-sectional view of a proportioning control valve made pursuant to the teachings of the present invention; and FIG. 2 is a graphical representation of the operation of the valve illustrated in FIG. 1.

Referring now to the drawing, a proportioning control valve 10 includes a housing 12 having an inlet port 14, an outlet port 16, an exhaust port 18, and a control port 20. The inlet port 14 is connected to the rear service reservoir on the tractor, the outlet port 16 is communicated to the rear wheel service brakes of the tractor, and the exhaust port 18 is, of course, communicated to atmosphere. The control port 20 is communicated to the operator actuated brake control valve in the vehicle operator's compartment. When a brake application is to be effected, the driver operates the brake control valve, to transmit a pressure signal to the control port 20 of a magnitude controlled by the vehicle operator. The valve 10 responds to this pressure signal to communicate the inlet port 14 with the outlet port 16 as will be hereinafter described.

Housing 12 defines a bore 22 therewithin which slidably receives a relay piston 24. A combination inlet and exhaust valve mechanism valve member 26 is slidably mounted in the bore defining the exhaust port 18. The housing 12 defines a circumferentially extending valve seat 28, which circumscribes the bore defining the exhaust port 18. A spring 30 yieldably urges the combination inlet and exhaust valve 26 into sealing engagement with the valve seat 28. As can be seen in FIG. 1, which illustrates the positions the relay piston 24 and inlet exhaust valve 26 assume when the brakes of the vehicle are released, the outlet port 16, which is communicated to the rearwheel service brakes of the vehicle, is normally communicated to the exhaust port 18 through the passage defined within the inlet and exhaust valve 26.

A stem 32 projects from the relay piston 24 and terminates a circumferentially extending valve seating area 34 which is adapted to engage the portion 36 of the inlet and exhaust valve 26. The region 38 above the relay piston 24 is communicated to the control port 20 through passage 40, as will be hereinafter described. Accordingly, when a brake application is effected, the fluid pressure representing the modulated brake application desired by the operator is communicated to the region 38. Since the region 38 is communicated to the higher pressure, and the region below the relay piston 24 indicated by the numeral 42 is communicated to the exhaust port 18, the piston 24 will be urged downwardly until the valve seat 34 seats against the seating area 36. This is the so-called "lap" position, in which communication between the outlet port 16 and the exhaust port 18 is cut off, but communication has not yet been initiated between the inlet port 14 and the region 42.

Further downward movement of the relay piston 24, sufficient to overcome the force of the spring 30, cracks open the inlet and exhaust valve 26 from the valve seating area 28, thereby permitting fluid pressure from the rear service reservoir communicated to the inlet port 14 to communicate into the region 42. Of course, since region 42 is communicated to the rear wheel brakes through the outlet port 16, this pressure level is also communicated to the rear wheel brakes, thereby effecting a brake application. When the pressure level in the region 42 balances the pressure level in the region 38, the relay piston 24 moves back to the lapped position. When the brakes of the vehicle are released, the region 38 is vented, thereby causing the higher pressure level in region 42 to return the relay piston 24 to the position illustrated, thereby causing the inlet and exhaust valve 26 to cut off communication from the inlet port 14 into the region 42 and venting the region 42 to atmosphere through exhaust port 18. The preceding description of the operation of the relay piston 24 and inlet and exhaust valve 26 is conventional for commercially available relay valves which have been used for many years.

The present invention relates to the proportioning mechanism generally indicated by the numeral 44 which is installed in the passage 40 and permits normal operation of the relay portion of the valve as described hereinabove when the tractor is connected to a trailer, but which normally proportions communications from the control port 20 into the region 38 when the tractor is operated in the "bobtail" mode. Proportioned communication establishes a proportionally lower fluid pressure level in region 38 than that at port 20, thereby effecting a proportionally reduced brake application, which, as described hereinabove, is necessary to prevent the severe overbraking which could occur when the tractor is operated in the bobtail mode.

The proportioning mechanism 44 includes a portion 46 of the passage 40 which slidably receives a differential area proportioning piston 48. An exhaust passage 50 communicates the portion 46 with an exhaust port generally indicated by the numeral 52. The passage 50 is defined within a stem 54 which projects into a passage 56 which is defined within the piston 48. The passage 56 is communicated to the control port 20 and also to the region 38. A valve member 58 is slidably mounted in the passage 56 and is slidably urged to sealing engagement with the end of the stem 54 by a small spring 60. A radially inwardly projecting valve seat 62 is carried by the piston 48 and is adapted to sealingly engage the valve member 58 when the piston 48 is urged to the right viewing the figure. However, when the piston is urged to the left viewing the figure, the valve seat 62 is moved away from the valve member 58 due to the engagement of the valve member 58 with the end of the stem 54. The valve member 58 is conventionally designed so that air pressure may communicate around the periphery of valve member 58 when the valve seat 62 is urged away from the valve member 58.

As discussed above, the piston 48 is a differential area piston and is stepped to define a larger diameter portion 64 and a smaller diameter portion 68 with a shoulder 70 therebetween. The larger diameter portion 64 is slidably received in the portion 46 of the passage 40, and the smaller diameter portion 68 is slidably received within a bore 72 defined within a second proportioning piston generally indicated by the numeral 74. The piston 74 slides within the housing 12 and includes a larger diameter portion 76 which cooperates with a smaller diameter portion 78 to define a shoulder 80 therebetween. The shoulder 80 cooperates with the housing 12 to define a cavity 82 therebetween which communicates through a port 83 with the aforementioned rear service reservoir (not shown) which is normally charged by the fluid pressure source operated by the vehicle. The end 84 of the smaller diameter portion 78 cooperates with the shoulder 70 and the housing 12 to define a cavity 86 therebetween. The cavity 86 is communicated to the trailer supply line through a port 87. The trailer supply line innerconnects the braking systems of the tractor and trailer and which is normally charged to a predetermined pressure level when the vehicle is operated as a tractor-trailer combination vehicle. On the other hand, when the tractor is operated in the bobtail mode without a trailer, the cavity 86 is vented to atmosphere, since the trailer supply line is not connected and is itself vented to atmosphere. A spring 88 is located in the cavity 86 and bears against both of the pistons 48 and 74 to urge them apart viewing the figure.

In operation, and referring to FIG. 2, when the vehicle is operated as a tractor-trailer combination, the aforementioned supply line is pressurized. The pressure of the supply line interconnecting the tractor and the trailer is communicated to the cavity 86. Pressure in cavity 86, supplemented by the force of the spring 88, urges the piston 74 to right viewing the figure and urges the piston 48 to the left viewing FIG. 1. Since the proportioning piston 48 is held in a position in which the valve seat 62 is disposed away from the valve member 58 as long as the cavity 86 is pressurized, substantially uninhibited fluid communication between the control port 20 and the region 38 is permitted as long as the trailer supply line is pressurized to the predetermined level. Accordingly, the pressure level at the outlet port 16 will effect a brake application of substantially the same magnitude as the pressure level communicated from the vehicle brake valve to the control port 20. Operation of the valve 10 when the vehicle is so operated is illustrated by the dashed line A in FIG. 2, which indicates that the pressure level at the control port 20, indicated on the vertical axis, is substantially the same as that at the delivery port 16, indicated on the horizontal axis. Accordingly, the control valve 10 does not proportion when the vehicle is operated as a tractor-trailer combination.

However, when the tractor is operated in the bobtail mode, the aforementioned trailer supply line is vented, thereby venting the pressure level in the cavity 86. Accordingly, the piston 48 is free to move since it is then biased then only by the spring 88. Since the cavity 86 is vented, piston 48 establishes a larger fluid pressure effective area on the larger diameter portion 64 of the piston 48 which is communicated to the pressure level in the region 38 and a smaller fluid pressure responsive area on the smaller diameter portion 68 of the piston 48 which is exposed to the fluid pressure level at the control port 20. As will be discussed hereinbelow, the piston 74 remains stationary until the pressure level at the control port exceeds a predetermined percentage of the rear reservoir pressure. Accordingly, the piston 48 moves relative to the piston 74 to initiate proportioning action of the pressure communicated through the control port 20. As is well known to those skilled in the art, the proportioning piston 48 establishes a fluid pressure level in region 38 that is a predetermined fraction of the pressure at control port 20, that fraction being determined by the ratio of the fluid pressure effective areas across the piston 48. This proportioning action of the piston 48, which assumes a fully charged rear reservoir, is indicated by line AB in FIG. 2. As is well known to those skilled in the art, an incremental increase in pressure at fluid pressure control port 20 acting across the effective area of the smaller diameter portion 68 of the piston 48 urges the piston to the left viewing FIG. 1, thereby opening the valve seat 62 from the valve member 58 to permit communication from control port 20 into region 38, but only a portion of this pressure increase will be felt in the region 38, because the smaller fluid pressure increase will be sufficient to reclose the valve seat 62 against the valve member 58 because of the larger fluid pressure effective area responsive to the pressure level in region 38.

As discussed hereinabove, the piston 74 remains stationary until the fluid pressure at control port 20 exerts a sufficiently large force on the piston 74 to overcome the fluid pressure in the reservoir communicated to cavity 82 and acting upon the face 80 of the piston 74. Since the effective area of the face 80 is smaller than the effective area of the piston 74 exposed to the fluid pressure level at the control port 20, the pressure at the control port 20 sufficient to overcome the force acting on face 80 is less than full rear reservoir pressure. Accordingly, when this predetermined pressure at control port 20 is established, the piston 74 moves to the left viewing FIG. 1, until the shoulder 90 on the piston 74 engages the front face of the smaller portion 68 of the piston 48. Accordingly, the pistons 74 and 48, during further increases of pressure at the control port 20, operate conjointly as a single piston. Since the effective area of this conjoint piston (comprised of the pistons 48 and 74) which is exposed to the fluid pressure level at control port 20 is now substantially larger than the effective area of the portion 64 of the piston 48 exposed to fluid pressure in region 38, an incremental increase of the pressure at the control port 20 will result in a proportionally larger increase in fluid pressure in the region 38. For example, if the pressure level at control port 20 is increased 1 psi and the pressure ratio across the conjoint piston is 2:1, the resulting increase in region 38 will be 2 psi. This proportional increase continues until the pressure level in Region 38 equalizes with the pressure level at control port 20 at maximum pressure available in the braking system, represented at point C in FIG. 2. As can be seen, this equal to the full service braking pressure as indicated by the dashed line A. The curve ABC represents the normal operation of the system with normal pressure available to the system and, as indicated by FIG. 2, full pressure is available to the vehicle operator as indicated at point C even when the vehicle is operated in the bobtail mode if it is necessary for the vehicle operator to make a full-on brake application. This may be due, for example, because of a failure in the front braking system.

Assume now that a malfunction occurs and the pressure level in the rear service reservoir is now less than it would normally be under normal service conditions. Accordingly, the normal proportioning action of piston 48 only occurs until a pressure represented by point B' occurs, at which time the pressure level control port 20 overcomes the pressure from the rear service reservoir acting against face 80 of the piston 74. Accordingly, the pistons 48 and 74 began moving conjointly at the much lower pressure point B' rather than the higher pressure B. Accordingly, pressure is increased in the region 38 at a rate faster than the increase of pressure at control port 20, as represented by lines B' C' of FIG. 2. Accordingly, the full braking pressure available to the system is available to the vehicle operator at a much lower pressure level, represented by pressure line B' C', when the pressure level in the rear service reservoir is reduced. Accordingly, the equalization pressure between the control port 20 in region 38 is a direct function of the pressure level in the rear reservoir, thus fully meeting the governmental regulations which require full line pressure delivery in the event of a component failure.

We claim:

1. Proportioning control valve for a fluid pressure braking system for a tractor-trailer combination vehicle, said system including a reservoir and a trailer supply line communicating fluid pressure from the tractor to the trailer, said control valve including a housing having an inlet port, an outlet port, and a control port, valve means in said housing responsive to the pressure level at said control port for controlling communication between said inlet port and said outlet port, and proportioning means for controlling communication between said control port and said valve means, said proportioning means being responsive to the pressure level in said supply line for shifting from a first condition permitting said valve means to establish a pressure level at said outlet port that is a first predetermined function of the pressure level at the control port to a second condition permitting said valve means to establish a pressure level at said outlet port that is a second predetermined function of the pressure level at said control port, said proportioning means in said second condition being responsive to the pressure level at the control port and the pressure level in said reservoir to change the pressure level at said outlet at a rate which varies as a function of the pressure level in said reservoir.

2. Proportioning control valve as claimed in claim 1, wherein said proportioning means in said second condition shifts between said first and second rates as a function of the ratio of the pressure levels in said reservoir and at said control port.

3. Proportioning control valve as claimed in claim 1, wherein said proportioning means includes differential area piston means slidably mounted in said housing, and valve mechanism operated by said differential area piston means controlling communication between said control port and said valve means.

4. Proportioning control valve as claimed in claim 3, wherein said differential area piston means is responsive to the pressure level in said reservoir and the pressure level at the control port to shift between said first and second predetermined rates in response to the ratio between the pressure levels at said control port and in said reservoir.

5. Proportioning control valve as claimed in claim 4, wherein said inlet port is also connected to said reservoir.

6. Proportioning control valve means as claimed in claim 3, wherein said differential area piston means includes a first component having a larger area exposed to the pressure level in the valve means and a smaller area exposed to the pressure level at said control port and a second component having a fluid pressure responsive area responsive to the fluid pressure level at said control port, said second component joining with said first component when the ratio of the areas across said differential area piston means changes so that said first and second components move as a single component having a larger area exposed to the fluid pressure level at said control port and a smaller area exposed to the fluid pressure level at said valve means.

7. Proportioning control valve means as claimed in claim 6, wherein said second components is responsive to the pressure differential between said reservoir and the control port to move into engagement with said first component for movement therewith when the pressure differential at said control port exceeds a predetermined fraction of the pressure level in said reservoir.

8. Proportioning control valve means as claimed in claim 7, wherein each of said components includes means responsive to the pressure level in said supply line to cause said differential area piston means to hold said valve mechanism open when said proportioning means is in said first condition regardless of the pressure level at said control port.

9. Proportioning control valve means as claimed in claim 3, wherein said differential area piston means includes means responsive to the pressure level in said supply line to cause said differential area piston means to hold said valve mechanism open when said proportioning means is in said first condition regardless of the pressure level at said control port.

10. Proportioning control valve means as claimed in claim 1, wherein said differential area piston means including a pair of components, each of said components having a fluid pressure responsive effective area communicated to the pressure level in said supply line, said components cooperating with said valve mechanism to hold said valve mechanism open when the pressure differential responsive means is in the first condition, said components causing said valve mechanism to proportion communication when the pressure level in said supply line communicated to said effective area drops below a predetermined level, the ratio of the effective areas across the differential area piston means being established by the effective differential area across said components, said components being responsive to the ratio of the pressures at said control port and said reservoir to change said effective area from said first ratio to said second ratio.

11. Pressure responsive valve means as claimed in claim 10, wherein one of said components further includes a pressure responsive surface communicated to said control port and a pressure responsive surface communicated to the pressure level at said valve means and the other component has a pressure responsive surface communicated to said control port and a pressure responsive surface communicated to the pressure level in said reservoir.

12. Proportioning control valve for a fluid pressure braking system for a tractor-trailer combination vehicle, said system including a reservoir, a trailer supply line communicating fluid pressure from the tractor to the trailer, and fluid pressure responsive brakes controlled by said control valve, said control valve being responsive to a pressure signal to effect a brake application and including proportioning means shiftable from a first condition permitting a full pressure brake application to a second condition effecting a proportioned brake application, said proportioning means shifting from said first condition to said second condition in response to the pressure level in said supply line, said proportioning means further including proportioning rate changing means for changing the proportioning rate when the proportioning means is in the second condition, said proportioning rate changing means being responsive to the ratio of said control signal and the pressure level in said reservoir to change said proportioning rate.

13. Proportioning control valve as claimed in claim 12, wherein said proportioning rate changing means causes said proportioning means to proportion at a first rate when said ratio is below a predetermined level and at a second rate when said ratio is above a predetermined level.

14. Proportioning control valve as claimed in claim 13, wherein said proportioning rate changing means is a differential area piston having a pair of fluid pressure responsive areas, said areas being communicated respectively with the control signal and the reservoir.

15. Proportioning control means as claimed in claim 13, wherein said proportioning means includes a first differential area piston having a fluid pressure responsive area communicated respectively to the control signal and the pressure level communicated to said brakes and said proportioning rate changing means includes a second differential area piston having fluid pressure responsive area communicated respectively with the control signal and the reservoir, said first piston moving relative to the second piston to establish said first rate, said pistons moving in unison to establish said second rate.

16. Proportioning control means as claimed in claim 15, wherein each of said differential area pistons include fluid pressure responsive areas communicated to said trailer supply line.

* * * * *